(12) United States Patent
Zoller (10) Patent No.: US 11,163,031 B1
(45) Date of Patent: Nov. 2, 2021

(54) MAPPING LIGHT LOCATION THROUGH A DATA MODULATED LIGHT OUTPUT AND REAL-TIME LOCATION INFORMATION

(71) Applicant: SYNAPSE WIRELESS, INC., Huntsville, AL (US)

(72) Inventor: Jeremy Jacob Zoller, Huntsville, AL (US)

(73) Assignee: Synapse Wireless, Inc., Huntsville, AL (US)

( * ) Notice: Subject to any disclaimer, the term of this patent is extended or adjusted under 35 U.S.C. 154(b) by 0 days.

(21) Appl. No.: 16/054,052

(22) Filed: Aug. 3, 2018

(51) Int. Cl.
*G01S 1/70* (2006.01)
*H04W 4/12* (2009.01)

(52) U.S. Cl.
CPC ............... *G01S 1/70* (2013.01); *H04W 4/12* (2013.01)

(58) Field of Classification Search
CPC .................................. G01S 1/70; H04W 4/12
USPC .......................................................... 356/614
See application file for complete search history.

(56) References Cited

U.S. PATENT DOCUMENTS

| 8,334,901 | B1* | 12/2012 | Ganick | .................. | H05B 47/19 348/131 |
|---|---|---|---|---|---|
| 9,008,519 | B2 | 4/2015 | Park et al. | | |
| 9,374,874 | B1* | 6/2016 | Ewing | .................... | G08C 17/02 |
| 9,857,162 | B1* | 1/2018 | Gum | ........................ | G01S 5/16 |
| 10,778,330 | B1 | 9/2020 | Zoller | | |
| 2009/0171571 | A1 | 7/2009 | Son et al. | | |
| 2010/0215378 | A1 | 8/2010 | Rajagopal et al. | | |
| 2014/0045549 | A1* | 2/2014 | Ryan | ....................... | H04W 4/33 455/556.1 |
| 2014/0086590 | A1* | 3/2014 | Ganick | ................. | H04W 12/06 398/118 |
| 2014/0280316 | A1* | 9/2014 | Ganick | ............... | G06F 16/2457 707/769 |
| 2014/0375982 | A1* | 12/2014 | Jovicic | ................... | G01C 21/00 356/72 |
| 2015/0147067 | A1* | 5/2015 | Ryan | ....................... | H04L 67/12 398/118 |
| 2016/0047890 | A1* | 2/2016 | Ryan | ........................ | G01S 1/70 398/118 |

(Continued)

OTHER PUBLICATIONS

Zoller, U.S. Appl. No. 16/054,050, entitled, "Identification of Orphaned Light Sources in Wireless Lighting Networks," filed Aug. 3, 2018.

*Primary Examiner* — Tri T Ton (74) *Attorney, Agent, or Firm* — Maynard Cooper & Gale, P.C.; Jon E. Holland (57) ABSTRACT

Lights sources may be installed in a facility without regard to their unique identifiers, which are necessary for a lighting control system to exercise control over the light sources. After installation, a mobile device can identify the identifier of a particular light source through use of a mobile device with a photodetector that detects visible light signals emitted by a light source. The user of the mobile device may locate themselves within range of a light source. The light source transmits a visible light signal to convey information includes an identifier of the light source, such as a MAC address. The mobile device can then determine a correspondence between the light source's identifier and its location in the facility. Accordingly, a mapping of a plurality of light sources can be created while minimizing the possibility for human error during commissioning of a lighting system.

18 Claims, 6 Drawing Sheets

(56) References Cited

U.S. PATENT DOCUMENTS

2016/0149640 A1 5/2016 Jovicic
2016/0241338 A1* 8/2016 Ganick .................. G06Q 30/02
2017/0269186 A1* 9/2017 Sharma ................. H04L 63/068
2017/0353824 A1* 12/2017 Hallett .................. H04W 4/029

* cited by examiner

MAPPING LIGHT LOCATION THROUGH A DATA MODULATED LIGHT OUTPUT AND REAL-TIME LOCATION INFORMATION

RELATED ART

Modern wireless lighting control systems allow for a great deal of flexibility in the installation of wired or wireless network-enabled lighting solutions. However, as lighting installers set up increasingly large and complex lighting systems, several difficulties may arise. Lighting control systems typically use preset identifiers, such as network identifiers, to uniquely identify individual lights, communicate with those lights, and control their functions. An accurate mapping of such identifiers to the location of the physical lights aids in the efficient management of a lighting system. However, installers may not be aware at the time of installation of those identifiers or of changing network management needs, and as a result, at the end of installation, the physical location of particular lights may be unknown. Often the identifiers are manually associated with the appropriate light locations during a commissioning process, which can be burdensome and time consuming.

In one known solution, during installation, installers are given labels to place on or near a light, where a label includes the light's identifier, such as a MAC address. These labels may be used later during commissioning to determine the network identifier of a lighting system so that it can be associated with the system's location. However, these labels may be overlooked on installation, or if actually placed, may be inconsistent in their placement or difficult to see. In addition, a user may erroneously input the incorrect identifier from one or more labels during commissioning.

U.S. Pat. No. 9,374,874 describes a system for commissioning a facility after installation of its lights. In the disclosure of that patent, a light system is managed such that a light with a particular known identifier is controlled to "blink" (to oscillate between "on" and "off" states) at a rate visible to the naked eye of a user performing the commissioning. When the user sees that a light is blinking, the user, knowing the identifier of the light that was scheduled to blink, becomes aware of the installation location associated with the identifier of the light. The user, through a graphical user interface (e.g., a facility map) on a mobile device carried by the user, may drag and drop an icon representing the light with the known identifier to the appropriate location on the map of the facility. The network identifier of the blinking light is automatically associated with the light at that map location by a central management system for the lighting installation. Each light is individually instructed to blink one at a time, and the lights are therefore identified by the user serially.

However, the method of U.S. Pat. No. 9,374,874 requires that the user physically traverse the building space (potentially a large facility) and observe blinking lights. In a building that is difficult to traverse or lacks clear sightlines to one or more light sources, a person may not be able to observe whether a light is blinking, and finding a blinking light may sometimes be difficult or time consuming. This system may also be subject to human error.

Accordingly, further techniques for commissioning a set of installed lights are generally desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to lighting control systems and methods. In one exemplary embodiment, light sources (such as light emitting diodes, commonly referred to as LEDs) are installed in an indoor facility, such as a building. The light sources can be controlled by a set of lighting controllers, which control the operation of the respective light sources, and a central lighting management system that communicates with the light sources and their controllers through a wireless network. The central lighting management system stores a mapping of each light source that sets forth an association between the location of a light source and a unique identifier for the light source, such as its MAC address. If this mapping is not created at the time of installation, or if lighting sources are added or moved, a user may have to provide inputs for mapping each light to its appropriate identifier, part of a process known as commissioning. The user can collect this information through use of a mobile device with a photo-detecting component that can recognize modulation of a light source's output. A lighting controller can instruct the light source to modulate its output to communicate identifying data at a rate not visible to users but readable by the photo-detecting device. The user, being in a communication range of the light source, can access, through the mobile device, the light source's identifier emitted by the light fixture, and determine the MAC address (or other ID data) being emitted by the fixture itself. The user device can also determine the location of the photo-detecting device at the time of data reading, through a real-time locating system (RTLS). The user then sends the identifier and location to the lighting management system. This makes identifying and locating more seamless during commissioning.

Figure 1:
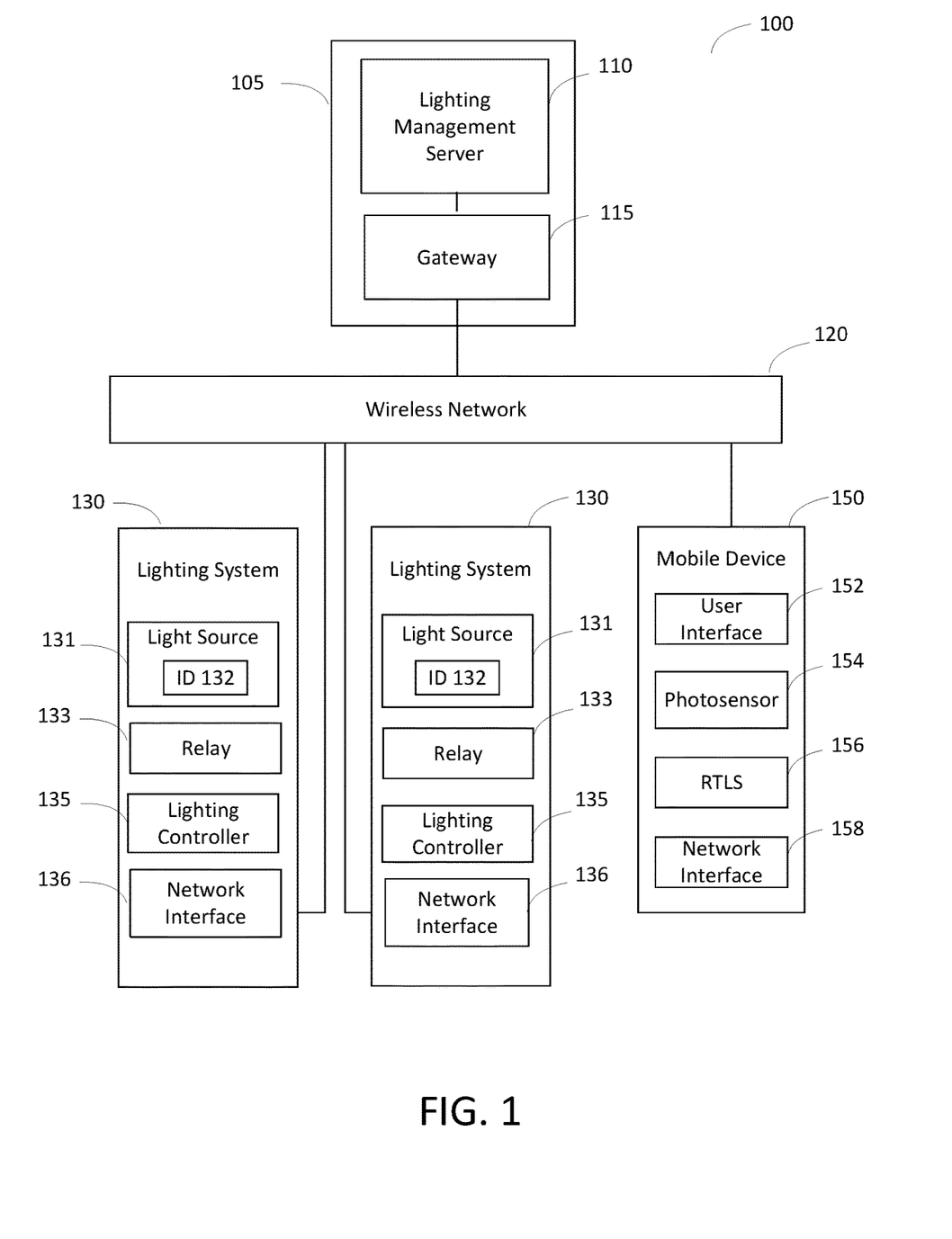
FIG. 1 is a block diagram illustrating an exemplary embodiment of a wireless network in accordance with the present disclosure.

FIG. 1 depicts an exemplary embodiment of a lighting control system 100 installed in an indoor (or largely indoor) space (e.g., a building or warehouse). The lighting control system 100 comprises a lighting management server 110 coupled to a gateway 115. In an exemplary embodiment illustrated in FIG. 1, lighting management server 110 and gateway 115 are different logical components in a server 105. In such embodiments, the lighting management server 110 and gateway 115 may reside within the same housing and/or share resources, such as processing hardware or other components, although other configurations of the server 105 are possible. In alternate embodiments, lighting management server 110 and gateway 115 may be discrete network devices connected via a wireless or wired connection. As an example, the lighting management server 110 may reside at a remote location and communicate with the gateway through a network, such as the internet or other type of wide area network (WAN), as further described below. In yet another alternate embodiment, the functionalities of lighting management server 110 and gateway 115 are all performed by a single logical component of the server 105.

In any of the embodiments described herein as using a gateway 115, the gateway 115 may convert messages in accordance with one protocol into messages in accordance with another protocol for transmission of the messages through a different type of network. As an example, if the lighting management server 110 is at a remote location, the gateway 115 may receive messages from the wireless network 120 and encapsulate such messages in accordance with TCP/IP or other protocol for transmission of the messages to the lighting management server 110. Messages from the wireless network 120 to be transmitted to other destinations may be similarly encapsulated or otherwise converted into a different protocol as may be desired. In the opposite direction, the gateway 115 may de-encapsulate messages received from a WAN or other type of network to remove overhead used by the WAN or other type of network for routing messages.

In the embodiment shown by FIG. 1, the gateway 115 connects the lighting management server 110 to one or more lighting systems 130 via a wireless network 120. In the preferred embodiment, the wireless network 120 is a network of wireless devices (e.g., lighting systems 130), but different types of wireless or, alternatively, wired networks (or combinations thereof) are possible in other embodiments. Note that use of a gateway 115 is unnecessary. As an example, it is possible for the server 105 to have a communication device, such as an RF radio, that permits the lighting management server 110 to communicate directly with the wireless network 120 in accordance with the protocol used by the wireless network 120.

Figure 6:
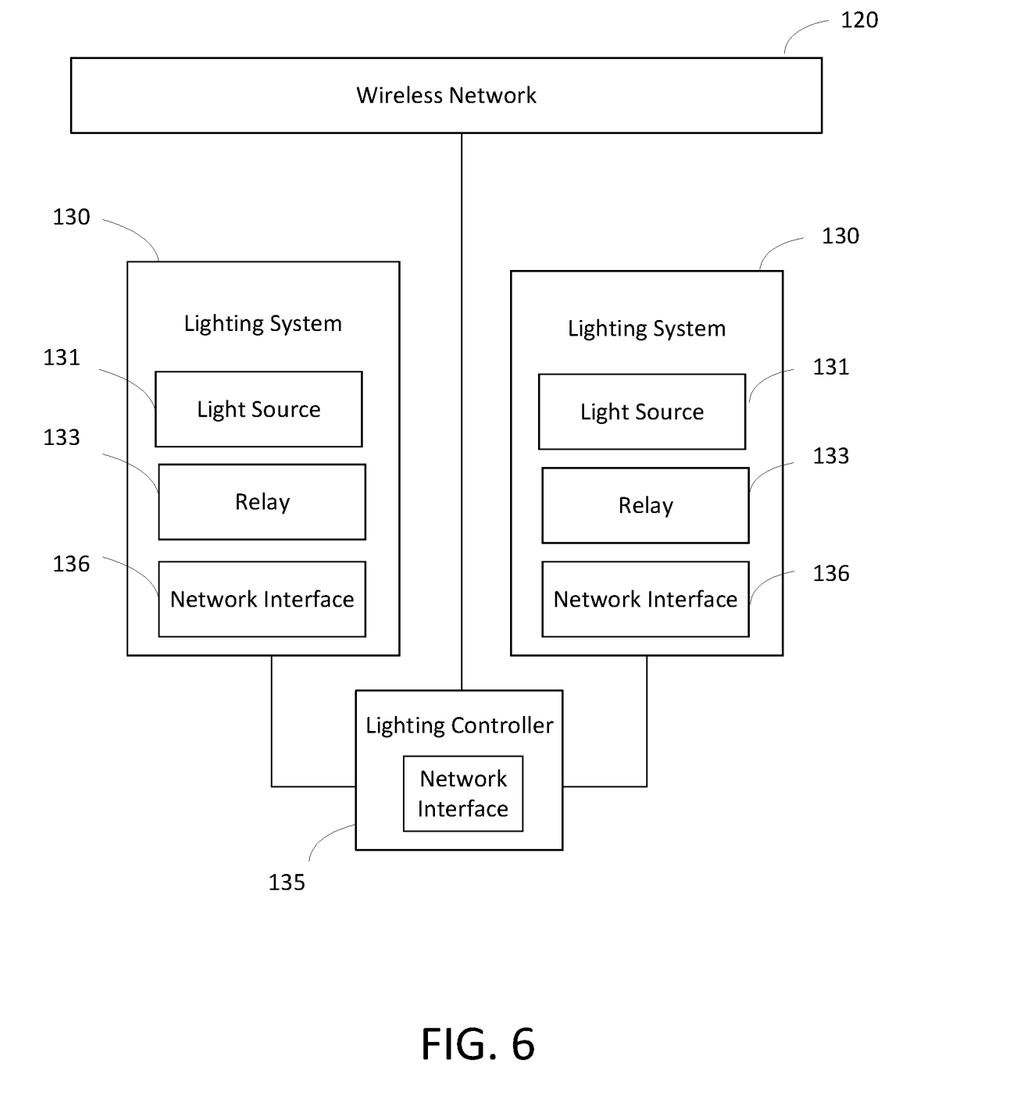
FIG. 6 is a block diagram illustrating a portion of a wireless network in accordance with an alternate embodiment of the disclosure.

In the preferred embodiment shown by FIG. 1, each lighting system 130 comprises a light source 131 such as a light emitting diode (LED) (or if appropriate, a laser diode, a fluorescent lamp, an incandescent light, or other light source), a lighting controller 135 for controlling the light source 131, a relay 133, and a network interface 136 for communicating via wireless (e.g., radio frequency (RF)) signals. The light sources 131 illuminate an area of the facility with visible light. The relay 133 is an electrically operated switch configured to supply electrical current to the light source 131 based on control signals from the lighting controller 135. Note that in FIG. 1, only one light source 131 and one lighting controller 135 are shown in each lighting system 130 for illustrative purposes, but any number of light sources 131 and any number of lighting controllers 135 may be utilized in each lighting system 130 in other embodiments. In an alternate embodiment, shown in FIG. 6, a single lighting controller 135 may control multiple light sources. Lighting controller 135 can exercise various controls over light source 131, including, for example, turning the light source 131 on and off, or dimming the brightness of the light source 131. In an exemplary embodiment, each light source 131 is stationary (fixed in place) after installation, however, alternate embodiments may exist such that a light source can be moved to a different physical location.

For illustrative purposes, with reference to FIG. 1, it can be assumed that any of the components of lighting control system 100 are capable of wireless communication with any device or component connected to it (either directly or indirectly) by the depicted lines. However, it will be noted that in addition to, or as an alternative to, wireless communication, any or all of the components of the lighting system 130 may be coupled to another component through a physical medium.

In the preferred embodiment of FIG. 1, each lighting system 130 is a distinct node of the wireless network 120 and is independently manageable through use of a network identifier 132 that uniquely identifies the node so as to distinguish it from other nodes of the wireless network 120. In other words, the network identifier 132 can be used as an identifier in communication over wireless network 120, where a message transmitted over the wireless network 120 through RF transmission can use the network identifier 132 to identify the lighting system 130 as a source or destination of the message. In one embodiment, network identifier 132 refers to the light source 131 in combination with other components of the lighting system 130. In another embodiment, the light source 131 may be a node of the wireless network 120 physically distinct from its respective lighting controller 135 and the network identifier 132 would in that case be an identifier of the light source 131.

The embodiment shown by FIG. 1 also includes a mobile device 150 operable by a user. Although only one mobile device 150 is shown, it will be understood that any number of mobile devices 150 may be in use in the lighting control system 100. A mobile device 150 may, in the preferred embodiment, be a mobile computing device such as a cellular telephone, PDA, tablet, laptop computer, or a handheld peripheral device, among other things. The mobile device 150 includes a network interface 158, via which the mobile device 150 is capable of communicating with the lighting management server 110 and the lighting systems 130. While, in one embodiment, mobile device 150 communicates via RF communication, the mobile device 150 may instead (or additionally) communicate via infrared or ultrasound technology as appropriate, or via another form of wireless communication. The mobile device 150 also includes a photosensor 154, which is any type of photo-detecting sensor (e.g., a photodiode, phototransistor, among others). The photosensor 154 is capable of receiving data from lighting system 130 through the modulation of light source 131 (such as data through visible light communication (VLC) technology), the receipt of which is described further in the present disclosure, and may also be capable of receiving an on/off status of light source 131, among other information.

In the preferred embodiment, mobile device 150 may also use real-time locating system (RTLS) technology (via RTLS component 156) to identify and/or track the location of the mobile device 150, which will be described further in the present disclosure. In a different embodiment, the photosensor 154 may itself include an RTLS tag (i.e., photosensor 154 and RTLS component 156 would be a single component). In yet another embodiment, the location of the mobile device 150 may be determined by means other than RTLS.

The mobile device 150 may also, in one embodiment, include a user interface 152. A user carrying the mobile device 150 may use the user interface 152 to enter or identify the location of a light source 131, as described in more detail in the present disclosure. The user interface 152 may be a software-implemented graphical user interface (GUI), however, the user interface 152 may take any form (e.g., text-based entry) that allows the user to view information received through the sensor 154 and/or to input information for transmission to the lighting management server 110 through the mobile device 150 as described herein.

Despite the reference to a "mobile" device throughout the present disclosure, it is also possible in an alternative embodiment for the mobile device 150 to be substituted with a stationary device (e.g., a desktop computer) with the photosensor 154 and the RTLS component 156 being separately-enabled mobile components that communicate to the stationary device or directly to the lighting management server 110.

Figure 2:
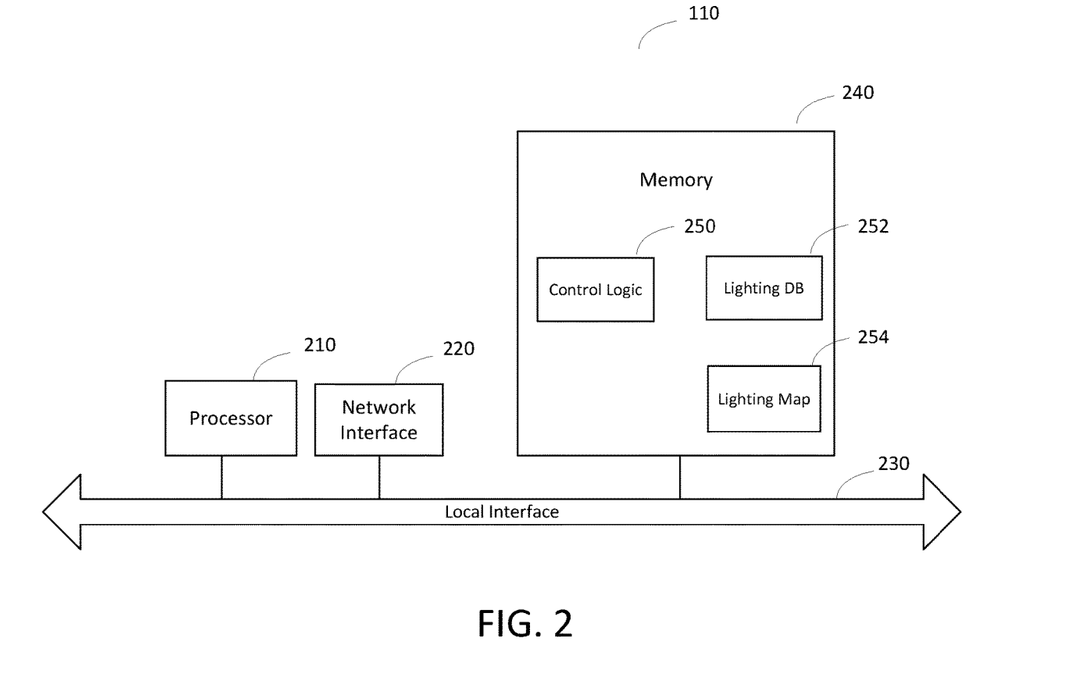
FIG. 2 is a block diagram illustrating an exemplary embodiment of a lighting management server, such as is depicted by FIG. 1.

FIG. 2 depicts a lighting management server 110 in accordance with an exemplary embodiment of the present disclosure. The exemplary server 110 comprises at least one processor 210, such as a central processing unit (CPU), digital signal processor, other specialized processor or combination of processors, or other circuitry that communicates to and drives the other elements within server 110 via a local interface 230 (for example, a bus). The server 110 has control logic 250 for generally controlling the operation of the server 110. The control logic 250 can be implemented in software, hardware, firmware, or any combination thereof. In the embodiment illustrated in FIG. 2, the control logic 250 is implemented in software and is stored in a memory 240. Various other data and code can also be written to or read from memory 240. Control logic 250, when implemented in software, can also be stored on any computer-readable medium, for example electronic, magnetic, or optical mediums, among others, or another system, apparatus, or device. The control logic 250 is implemented by the processor 210 or any other circuitry capable of executing the instructions of the control logic 250. The server 110 also has a network interface 220 for enabling communication with other devices in lighting control system 100. In an exemplary embodiment, network interface 220 enables communication to devices on the wireless network 120 via the intermediary gateway 115 (FIG. 1). Communication between lighting management server 110 and gateway 115 may be performed, for example, over a wide area network (WAN), such as, for example, the internet, or other type of network. In an exemplary embodiment, the network interface 220 is configured to communicate wirelessly over one or more geographic areas, but the interface 220 may alternately or additionally exchange data via a physical medium.

The memory 240 comprises control logic 250 for generally controlling the operation of the lighting management server 110. The control logic 250 is configured to identify the location of the lighting systems 130 (such process also referred to herein as "commissioning") via the wireless network 120, to communicate with them, and to configure them for operation. In a preferred embodiment, the control logic 250, via the network interface 220, may communicate with the lighting systems 130 and the mobile device 150 as part of the commissioning by transmitting messages through the network interface 220 in order to, for example, manage an on/off state of each light source 131 and receive information from mobile device 150, discussed in more detail hereafter. As described above, these messages may be directed to a lighting system 130 (by lighting management server 110, or any device on wireless network 120) through use of a unique network identifier 132 assigned to the lighting system 130.

The memory 240 also stores a lighting database 252 and a lighting map 254, each containing information related to the commissioning process. The control logic 250 is configured to manage the lighting database 252 and the lighting map 254. It will be noted that while FIG. 2 refers to a lighting "database" and a lighting "map," the information stored within may not be in a database structure or a map structure, and instead any type of data structure may be used.

The information in lighting database 252 and lighting map 254 is used in the commissioning of the RF network. Namely, lighting database 252 and lighting map 254 provide data structures that store an association of each lighting system 130 (and/or the components thereof) with its respective location in the facility. During the commissioning of the RF network, lighting database 252 stores information collected by the mobile device 150 and information for management of each of the lighting systems 130, including a unique identifier 132 for every light source 131 known to be installed in the facility, and, when known, information specifying the respective location of each of those light sources 131. This unique identifier 132 may, in a preferred embodiment, be a network identifier for the light source 131. In one example, the identifier 132 may be a MAC address of the light source 131.

These network identifiers 132 may be used in the communication with and/or control of lighting systems 130 over wireless network 120. More particularly, lighting management server 110, or any device connected to wireless network 120, may communicate with a lighting system 130 by transmitting a message, via RF communication, that specifies the network identifier 132 as the destination of the message. Similarly, the network identifier 132 of a lighting system 130 intending to send or transmit a message may be included in a message to specify the lighting system 130 as the source of the message. In other words, the network identifier 132 allows for the corresponding lighting system 130 to participate in communication over the wireless network 120. In an alternate embodiment, rather than the network identifier 132 (e.g., the MAC address of a light source) itself, another value uniquely associated with the network identifier 132 may be included in the message sent over the RF network, with such associated values being known by all of the networked devices.

The stored location information and the network identifier 132 for the light sources 131 in the facility are taken together, by control logic 250, to generate the lighting map 254. The lighting management server 110 may refer to lighting map 254 to control light sources based on their relative location in a facility.

Figure 3:
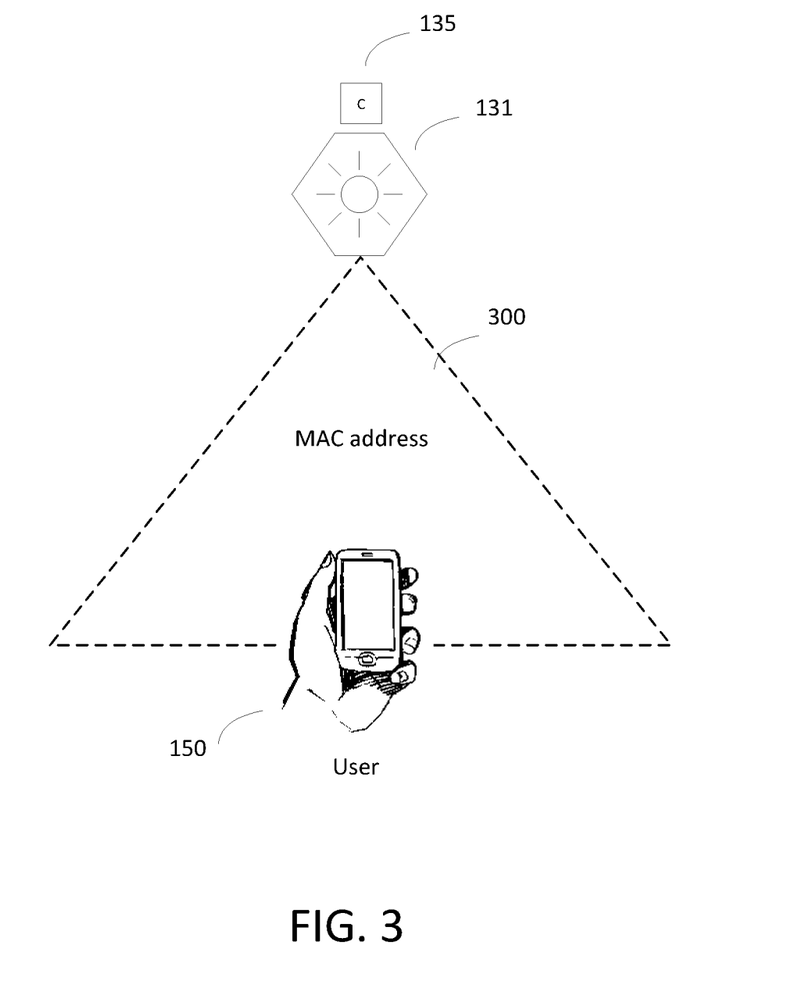
FIG. 3 is a diagram depicting a system for receiving data via a visible light signal, in accordance with an exemplary embodiment of the disclosure.

FIG. 3 depicts an example of an installation of certain components of a lighting system 130 and a mobile device 150 held by a user. As illustrated, a user takes the mobile device 150 into an environment in which a light source 131 (shown in combination with lighting controller 135) is located. In the exemplary embodiment, the lighting system 130 that includes light source 131 and lighting controller 135 is in a commissioning mode, i.e., a mode in which certain information is conveyed by the light source 131 to aid in the commissioning (or identification) of the light source 131. This commissioning mode is, in one embodiment, separate from the normal operation of the light source 131 (generally to simply illuminate a particular area in accordance with any configuration of lighting pattern). In another embodiment, rather than a specific "commissioning mode," the lighting system 130 may be configured to continuously (or periodically) operate to perform the function(s) of the commissioning mode, without leaving its normal mode of operation.

The lighting system 130 may, in one embodiment, be instructed to enter a commissioning mode by the lighting management server 110. Alternatively, the mobile device 150 may convey a request to the lighting system 130 to enter a commissioning mode, either directly or via lighting management server 110 or another component of the lighting control system 100. It is also possible for the lighting system 130 to be configured to continuously operate in the commissioning mode in addition to its normal operation, or to operate in a commissioning mode at a scheduled timeslot, for example, during a maintenance window of the lighting control system and/or on a cyclical basis, e.g., weekly or monthly, as appropriate. In yet another embodiment, the commissioning mode may be initiated by the pressing of a physical switch on the light source 131.

In the commissioning mode (or when performing the function(s) of the commissioning mode), the lighting controller 135 controls the light source 131 to emit a visible light signal 300 that conveys information relevant to the commissioning of the lighting control system 100. One example of transmission using visible light communication (VLC) to provide navigation information is described in U.S. Patent Publication No. 2009/0171571 A1 ("Navigation System and Method Using Visible Light Communication").

With reference to FIG. 3, in the preferred embodiment of the present disclosure, lighting controller 135 acts as a signal modulator which controls the light source 131, e.g., an LED, to transmit visible light signals 300 using intensity modulation to encode data. In the preferred implementation, the lighting controller 135, which is aware of the identifier 132 (e.g., MAC address) of the light source 131, converts data representing that identifier to a protocol suitable for transmission by the light source 131. The lighting controller 135 then controls the relay 133 (FIG. 1) to turn light source 131 repeatedly on and off (i.e., controlling its intensity) or otherwise adjust its intensity in a manner that conveys the identifier data within the area illuminated by the light source 131. This transition between on and off (and vice versa) or other intensity adjustment occurs very quickly, at a rate that is not visible to the human eye. The visible light signal 300 thereby conveys information to a receptive photosensor (as referred to as a photodetector) 154 in the mobile device 150.

It will be understood that visible light is limited in its reach, as it cannot, for example, travel through walls or doors or travel past certain distances with a high illumination. A light source 131 may only emit a visible light signal 300 in a fixed (or predetermined) area after it is installed within a facility. However, a light source 131 need not itself be within visual sight of a user of mobile device 150 for its visible light signal 300 to be recognized by the mobile device 150, because the visible light transmitted by the light source 131 may reflect off of different surfaces (e.g., walls). Accordingly, it is apparent that the mobile device 150 will only be able to detect any information transmitting from light source through the visible light signal 300 when it is within that fixed area illuminated by the light source 131, as is shown in FIG. 3.

When the mobile device 150 has entered within a fixed area relative to the light source 131, such as a room of a building, or, more commonly, an area located immediately beneath or adjacent to the light source 131, the photosensor 154 of the mobile device 150 is able to recognize the visible light signal 300 transmitted by the light source 131. Photosensor 154 then generates from the visible light signal 300 the network identifier 132 of the light source 131 (in the embodiment of FIG. 3, its MAC address). The mobile device 150 may then store the identifier 132 in a memory or cache (not shown).

It will be noted that a light source 131 may be configured to transmit visible light in only a certain direction and area. In addition, the illumination or brightness of the visible light will diminish over distance. Light sources 131 can therefore be installed or managed so as to be in a configuration in which multiple light sources 131 do not transmit visible light to the same area. To the extent that the areas illuminated by light sources 131 do overlap and the mobile device 150 receives multiple visible light signals while trying to ascertain the identifier of a particular light source 131, the mobile device 150 may assume that the visible light signal 300 that has the strongest illumination or signal strength was transmitted by the light source 131 that is physically closest to the mobile device 150. In another embodiment, the mobile device 150 may query the user via the user interface 152 as to which light source 131 is the originator of a particular visible light signal. However, potential overlap between light sources 131 is reduced by the fact that the signal 300 is sent through visible light (which does not travel through opaque objects) rather than, e.g., Wi-Fi, as mobile device 150 would not receive or recognize overlapping visible light signals from light sources 131 separated from the mobile device 150 by a wall, door, or object.

A purpose of the commissioning process is to correlate a light source 131 with its location in a building. In view of this, it is beneficial for the user of the mobile device 150 to be able to determine such location. It can be assumed that a determination of the light source's location can be made with sufficient accuracy through a determination of the location of the mobile device 150 itself, as the mobile device 150 is physically near to the light source 131 (so as to be able to actually receive the visible light signal 300).

Figure 4:
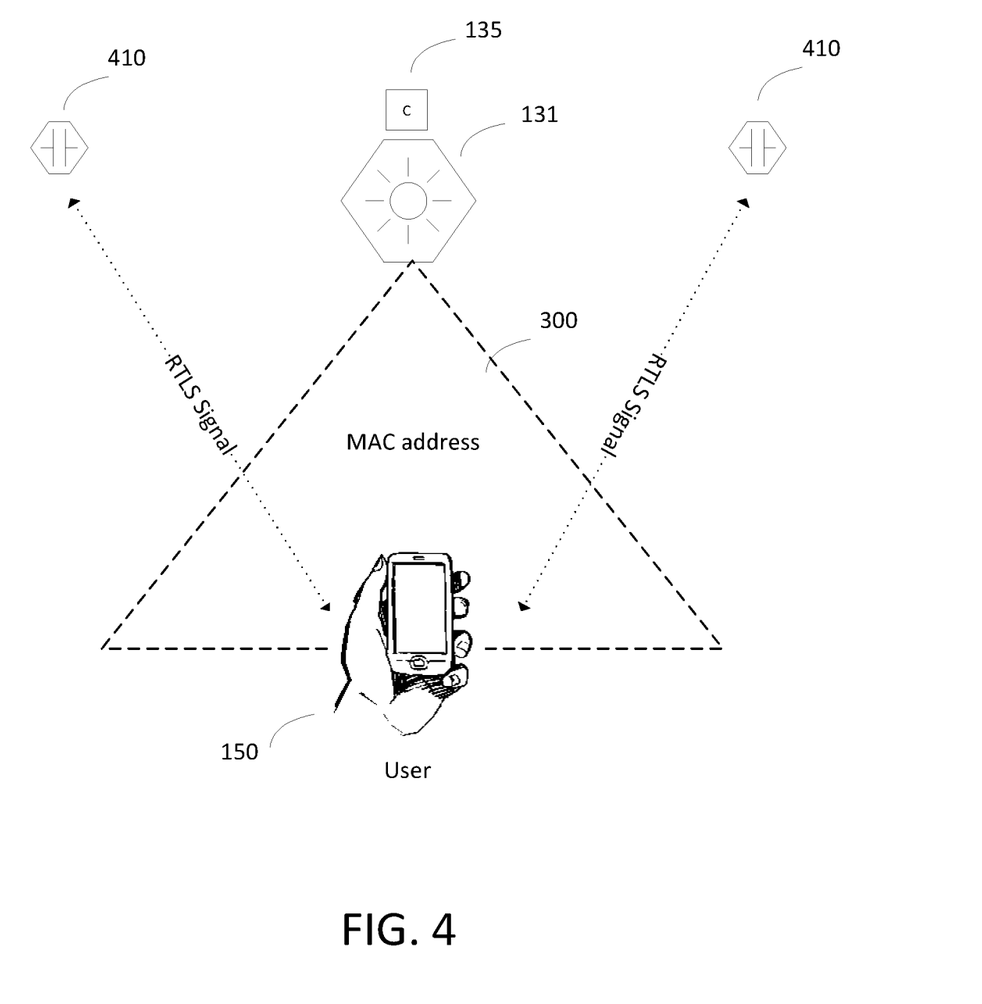
FIG. 4 is a diagram depicting a system for determining a location of a mobile device, in accordance with an exemplary embodiment of the disclosure.

In the preferred embodiment, the mobile device 150 may use real-time locating system (RTLS) technology (RTLS component 156 (FIG. 1)) to identify and/or track the location of the mobile device 150. FIG. 4 depicts the same configuration of mobile device 150, light source 131, and lighting control 135 shown in FIG. 3, with the addition of RTLS sensors 410 located within a transmission range of the mobile device 150. For example, the mobile device 150 could be tagged with an RTLS tag (RTLS component 156) which transmits/receives wireless short-range signals to RTLS sensors 410 installed in the building. In the preferred embodiment, the RTLS component 156 of mobile device 150 communicates with the RTLS sensors 410 via RF signals, however, they could alternately communicate with infrared or ultrasound technology, or other appropriate means of communication.

While FIG. 4 depicts the RTLS sensors 410 as components separate to any lighting components, it is also possible that a lighting system 130 that houses the lighting controller 135 and/or the light source 131 may itself contain an RTLS sensor.

In one embodiment, the sensor devices 410 send to the RTLS component 156 location information of the RTLS component 156. In another embodiment, the mobile device 150 may use triangulation (or any other locating algorithm) to determine its location based on signals received from the RTLS sensors 410. In yet another embodiment, the RTLS component 156 could relay or send its tag information to a remote processor such as a server or another device (not shown) which could determine the location of the RTLS component 156.

In an alternative embodiment, the location of the mobile device 150 may be determined by means other than RTLS. For example, the mobile device 150 may determine its location based on triangulation or by proximity detection (e.g., signal strength) based on wireless transmissions sent and received from devices (not shown) on wireless network 120 other than the RTLS sensors 410. The mobile device 150 may also, in certain scenarios, use GPS or another form of mobile phone tracking (e.g., multilateration based on transmissions to/from cellular broadcast towers or software level location-based services), although such methods are typically less precise or may be unavailable altogether in an indoor space.

Still further, the location of the mobile device 150 could be determined through an input by the user of the mobile device 150. In an alternative embodiment, the user interface 152 of mobile device 150 may provide a functionality for a user to enter or otherwise indicate his location (i.e., the location of the mobile device 150 carried by the user). One method to accomplish this would be through a graphical map displayed on the screen of the mobile device 150.

Figure 5A:
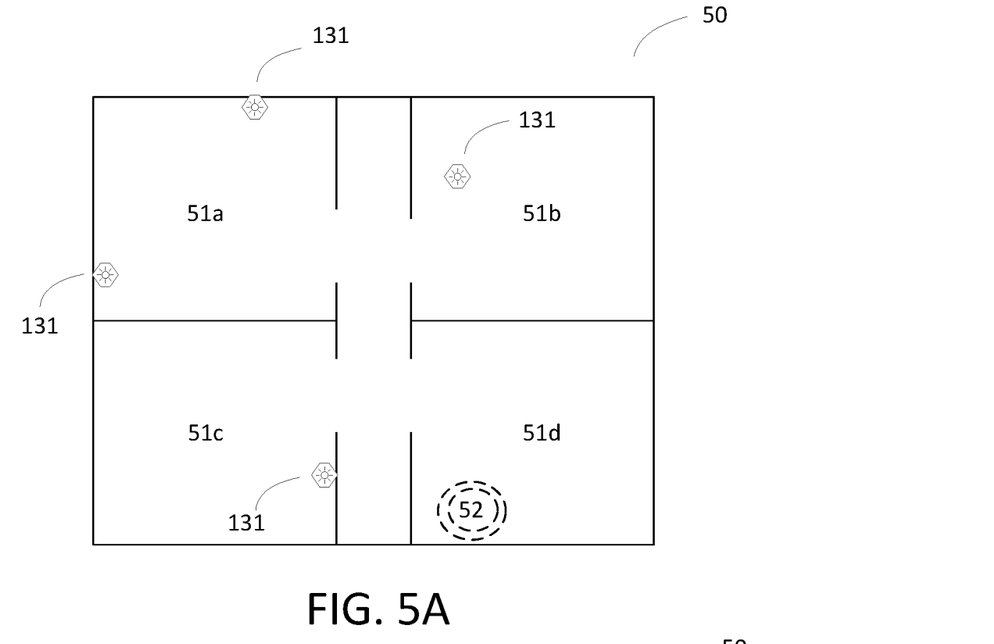
FIGS. 5A and 5B are diagrams depicting graphical user interfaces that display a map of a building, in accordance with an exemplary embodiment of the disclosure.
Figure 5B:
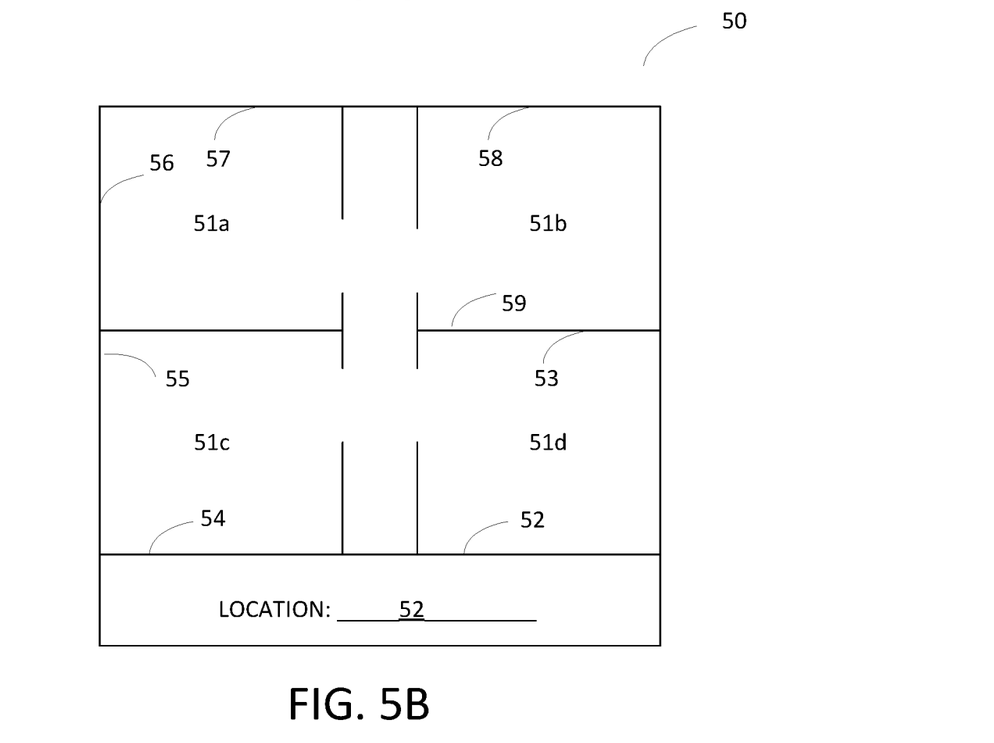

FIGS. 5A and 5B respectively depict a map (in a preferred embodiment, corresponding to lighting map 254) of a building having a plurality of rooms. In this regard, the lines shown in FIGS. 5A and 5B represent walls that divide rooms 51a-51d from one another and from a hallway that separates the rooms. A number of light sources 131 are installed in rooms 51a-51d. In the preferred embodiment, the map depicted in FIGS. 5A and 5B would be displayed via the user interface 152 of mobile device 150. When the user of the mobile device 150 enters an area with a light source 131 and approaches to stand within a certain illuminated area of that light source 131, the mobile device 150 receives a visible light signal 300 from the light source 131. This visible light signal 300 may communicate, for example, the MAC address of the light source 131. Upon receiving the MAC address, the user may pinpoint the location of the light source 131 on the map. The user, being familiar with the facility and aware of his own location, would, through interaction with the user interface 152, pinpoint his own location on the map. FIG. 5A depicts this location as location 52 (dotted lines) in room 51d. The user of the mobile device 150 could interact with the map to specify this location by, for example, a touch screen, use of a stylus, through a moveable crosshairs, or any other appropriate method. In an alternative example, depicted in FIG. 5B, particular locations in rooms 51a-51d may be pre-designated with identifying numbers (or other identifiers), shown in FIG. 5B as locations 52-59, and the user interface 152, may also include a field in which the user can enter a location number. A user, having received a visible light signal 300 of a light source 131 at location 52 in room 51d, could manually enter location "52" into user interface 152.

Once the mobile device 150 has associated a light source 131 with its location, whether by RTLS or another method, the mobile device may then store those two pieces of information in a memory (not shown). At the end of the commissioning process, or at any appropriate point in the process, the mobile device 150 can transmit the set of information containing any or all of the light source identifiers and their locations to the lighting manager server 110 via the network 120. As described above, this transmission is done through network interface 158 of the mobile device 150. If the size of the memory of the mobile device 150 does not permit storage of any or all of the lighting information, then the mobile device 150 may instead immediately transmit this information to lighting management server 110 via the network 120. While the information can be transmitted to the lighting management server 110 in many forms (e.g., a table, a map, a set of coordinates), it is understood that the identifier 132 of the light source 131 (the MAC address in the preferred embodiment) is sent in a manner in which it is associated with information sufficient to identify the location of the light source 131.

Lighting management server 110 receives the information transmitted from the mobile device 150 via the network interface 220. Lighting database 252 contains the identifier for every light source 131 known to be installed in the facility. When the lighting management server 110 receives information from the mobile device 150, the control logic 250 reads that information, pulls out the location information contained therein, and enters that location information in lighting database 252 in association with the appropriate network identifier 132 for its corresponding light source 131. Where the lighting database 252 already contains location information for a light source 131, control logic 250 may, in a preferred embodiment, overwrite the existing information in lighting database 252 with updated information, for the sake of efficiency of the commissioning process. In an alternative embodiment, in a case that the existing location information for light source 131 in the lighting database 252 conflicts with the location information for light source 131 received from the mobile device 150, the lighting management server 110 may take note of the conflict and may transmit a query to the mobile device 150 as to whether to overwrite the existing information. The user of the mobile device can confirm or reject overwrite as appropriate. If the information sent by the mobile device 150 to the lighting management server 110 contains information regarding the light source 131 that is not identified in the lighting database 252, it can be assumed that the light source 131 is newly installed, and that the relevant information for the light source 131 (and its corresponding lighting system 130) should be added to the lighting database 252.

The location information for a light source 131 may be stored in lighting database 252 in a variety of formats, e.g., as location coordinates of the light source 131 itself or of another component of the lighting system 130 which contains or is physically near to the light source 131, or as a parameter labeling the light source 131 as being located in a particular room or area, or belong to a particular group of lighting components, among other things. The lighting database 252 may also contain information about the light source 131 such as its status (on/off), its health, any groups (logical groups) of lights that the light source 131 may belong to, any mode or pattern the light source 131 is configured to follow, and/or any other appropriate information relevant to the management of the lighting control system 100.

The control logic 250 may use the information in the lighting database 252 to generate a lighting map 254. This lighting map 254 provides a graphical representation of the facility, with designations identifying each light source 131 at its respective location. The lighting map 254 may also include some indication of the status of any particular light source 131. In a preferred embodiment, the lighting map 254 may be viewed by a user on the mobile device 150, or by another device (not shown), to allow a network manager to easily view the installation configuration of the lights in the facility.

The systems and methods described above provide a way to identify a light source of interest even in a lighting installation that was not installed in any predefined configuration, and even where an installer did not have any knowledge of light identifiers. Accordingly, the process of installing and identifying lights is simplified, and errors that otherwise could arise by an installer incorrectly installing light sources relative to the light identifier mappings used by the system are mitigated or prevented. Further, because the lighting system described herein uses, e.g., standard LEDs, rather than specialized lights, the high costs of a specialized lighting configuration can be allayed.

This disclosure may be provided in other specific forms and embodiments without departing from the essential characteristics as described herein. The embodiments described are to be considered in all aspects as illustrative only and not restrictive in any manner.

Now, therefore, the following is claimed:

1. A system comprising:
   a lighting system comprising a light source and a lighting controller, wherein the lighting controller is configured to modulate the light source so as to cause the light source to transmit a visible light signal that communicates data, the data comprising a network identifier of the lighting system;
   a server comprising a memory storing a list of one or more lighting systems, the locations of which are unknown to the server; and
   a mobile device comprising a photodetecting sensor, the mobile device being configured to:
   (a) interpret the visible light signal transmitted by the light source to determine the network identifier of the lighting system,
   (b) determine the location of the light source, and
   (c) transmit, to the server, in association with each other, (i) the network identifier of the lighting system and (ii) the determined location of the light source.

2. The system of claim 1, wherein the server receives, from the mobile device, information associating the network identifier of the lighting system with the location of the light source, and
   wherein the server uses the received information to generate a map indicating the location of the light source.

3. The system of claim 1, wherein a plurality of light sources illuminate an area,
   wherein the server receives, from the mobile device, information associating the respective network identifiers of each of the plurality of light sources with their respective locations in the area, and
   wherein the server generates lighting map information for the area based on the information received from the mobile device.

4. The system of claim 1, wherein the network identifier is a unique network identifier that allows the lighting system to participate in communication over a wireless network.

5. The system of claim 1, wherein the data communicated by the visible light signal further comprises a MAC address of the light source.

6. The system of claim 1, wherein the lighting system is a node of a wireless network, and
   wherein the network identifier uniquely identifies the lighting system on the wireless network such that the server may communicate with the lighting system by transmitting a message, via RF communication, that specifies the network identifier as a destination of the message.

7. The system of claim 1, wherein the lighting system is a node of a wireless network,
   wherein the server receives, from the mobile device, information including the network identifier, and
   wherein the server transmits a message via the wireless network, the message including the received network identifier as an identification of the lighting system as a source or destination of the message.

8. The system of claim 1, wherein the lighting system is a node of a wireless network,
   wherein the server receives, from the mobile device, information including the network identifier, and
   wherein the server uses the network identifier in a process of commissioning the wireless network.

9. The system of claim 1, wherein the lighting system is a node of a wireless network, and
   wherein the lighting system uses the network identifier in communication with another node of the wireless network as an identification of the source of a message transmitted from the lighting system to the other node.

10. The system of claim 1, wherein the system further comprises:
    one or more real-time locating system (RTLS) sensors,
    wherein the mobile device comprises an RTLS tag, and
    wherein the mobile device determines the location of the light source by estimating a position of the RTLS tag of the mobile device with respect to the one or more RTLS sensors, and using the estimated position of the RTLS tag as the location of the light source.

11. The system of claim 1, wherein the mobile device determines the location of the light source by accepting an input from a user of the mobile device, the input specifying the location of the light source.

12. The system of claim 11, wherein the user of the mobile device inputs the location of the light source by selecting, via a graphical display on the mobile device, an area in which the light source is located.

13. The system of claim 1, wherein the light source is an LED, and
    wherein the lighting controller modules the light source by either (a) repeatedly switching the LED between an "on" state and an "off" state, or (b) adjusting the brightness of the LED, so as to modulate the intensity of the light emitted.

14. A method comprising:
    receiving, by a mobile device, a visible light signal transmitted by a light source;
    interpreting, by the mobile device, the received visible light signal to determine a network identifier of the light source;
    storing, by the mobile device, the network identifier of the light source in a memory;
    determining, by the mobile device, location information indicative of a location of the light source;
    storing, by the mobile device, in association with the network identifier of the light source, the location information; and
    transmitting, by the mobile device, to a remote server device, the network identifier of the light source in association with the determined location information, wherein the location of the light source is unknown to the remote server.

15. The method of claim 14, wherein the mobile device receives the visible light signal only when the mobile device is within a fixed area relative to the light source.

16. The method of claim 14, wherein the mobile device determines the location information by (a) receiving signals from one or more real-time locating system (RTLS) sensors, and (b) estimating the position of the mobile device relative to the one or more RTLS sensors based on the received signals.

17. The system of claim 1, wherein the mobile device determines the location of the light source by accepting an input from a user of the mobile device, the input specifying the location of the mobile device.

18. A method for locating one or more light sources installed in a facility, the method comprising:

determining, at a central server, that a stored mapping between one or more light sources and their respective locations should be generated or updated;

receiving, by a mobile device, a visible light signal transmitted by a light source;

interpreting, by the mobile device, the received visible light signal to determine an identifier of the light source;

storing, by the mobile device, the identifier of the light source in a memory;

determining, by the mobile device, location information indicative of a location of the light source;

storing, by the mobile device, in association with the identifier of the light source, the location information;

transmitting, by the mobile device, to the central server, the identifier of the light source in association with the determined location information; and updating, by the central server, the stored mapping based on the transmission from the mobile device.

\* \* \* \* \*